Dec. 4, 1934.  T. J. ERDMAN  1,982,862
CULTIVATOR
Filed May 3, 1933
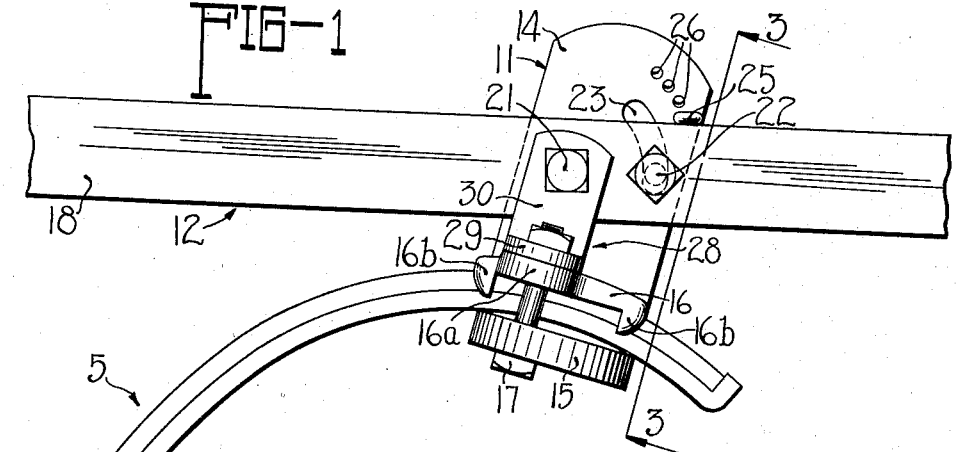
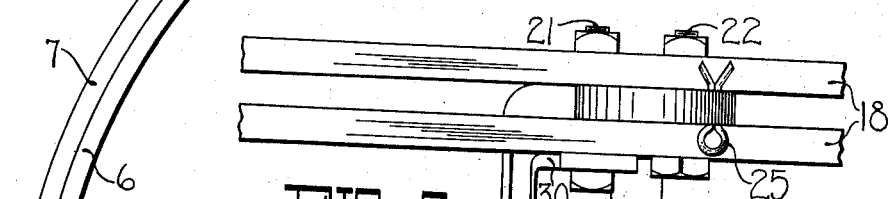
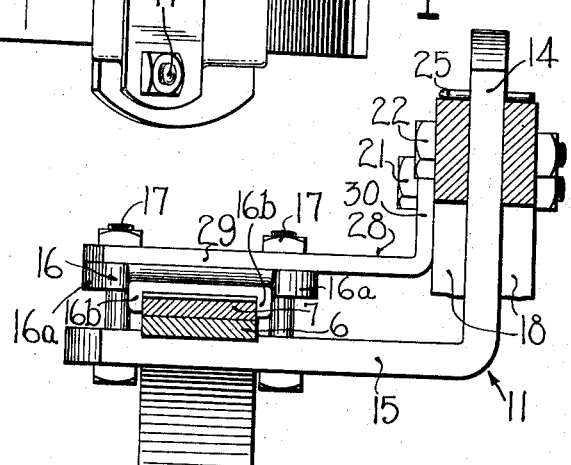
WITNESS.
Edward Melin.
INVENTOR
Theodore J. Erdman
BY
ATTORNEY Patented Dec. 4, 1934

1,982,862

UNITED STATES PATENT OFFICE 1,982,862

CULTIVATOR

Theodore J. Erdman, Horicon, Wis., assignor to The Van Brunt Manufacturing Company, Horicon, Wis., a corporation of Wisconsin Application May 3, 1933, Serial No. 669,149

4 Claims. (Cl. 97—198.1)

My invention pertains to spring tooth cultivators and relates particularly to a connecting bracket connecting a spring tooth to a cultivator drag bar.

The principal object of my invention is to provide a connecting bracket which may be connected to a drag bar in such a manner as to be easily and readily adjusted to vary the depth of penetration of the spring tooth and to securely hold the spring tooth in the desired adjusted position.

Another object of my invention is to provide a frangible member for the connecting bracket which may be adjusted to engage the drag bar in any of the adjusted positions of the connecting bracket to normally assist in holding the bracket in the desired adjusted position, but which is capable of shearing when the spring tooth engages an unyielding object so as to release the bracket, thereby allowing the tooth to swing away from the obstruction and prevent breakage to the tooth.

Another object is to provide a connecting bracket having means between the drag bar and spring tooth to strengthen the connecting bracket and to hold the spring tooth in rigid position.

Other objects and advantages of my invention will be apparent to those skilled in the art after a consideration of the following detailed description, taken in conjunction with the accompanying drawing wherein:

Figure 1 is a side elevational view of a spring tooth and a section of a drag bar and illustrating my improved connecting bracket;

Figure 2 is a fragmentary plan view of the structure shown in Figure 1; and,

Figure 3 is a sectional view taken on the plane of the line 3—3 of Figure 1.

The spring tooth, which is referred to in its entirety by numeral 5, comprises a flat spring steel shank 6 bent in the form of a letter C. A short reinforcing leaf 7, also constructed of flat spring steel, is bent to conform to the upper portion of shank 6 and is disposed in contact with the outer surface thereof. A double-pointed soil engaging shovel 8 is secured to the lower end of shank 6 by means of bolts 9.

The spring tooth 5 is clamped to a connecting bracket 11 which in turn is adjustably connected to a drag bar 12. The connecting bracket 11 is formed of an angle member and comprises a vertical leg 14 and a horizontal leg 15. The upper end of tooth 5 is clamped to the horizontal leg 15 by means of a clamping plate 16 and a pair of clamping bolts 17 extending upwardly through holes provided in leg 15 and in laterally extending ears 16a in plate 16. Plate 16 is also provided with depending lugs 16b at its four corners which embrace the sides of shank 6 and leaf 7 to prevent them from twisting relative to the connecting clamp.

The drag bar 12 comprises a pair of beam members 18 arranged in spaced parallel relation to receive therebetween the vertical leg 14 of bracket 11. The leg 14 is adjustably connected to beam members 18 by an attaching bolt 21 and a clamping bolt 22. The attaching bolt 21 is disposed in aligned holes in beam members 18 and leg 14 and serves as a pivot upon which bracket 11 is turned to adjust it from one position to another. The clamping bolt 22 extends through holes in beam members 18 and through an arcuate slot 23 provided in vertical leg 14 and serves to clamp beam members 18 against leg 14 to hold bracket 11 in the desired position. The arcuate slot 23 is formed concentric with bolt 21 so that bracket 11 may be adjusted without removing bolt 22.

A break pin 25 is provided in vertical leg 14, to contact with the upper edges of beam members 18 and serves to assist in holding the bracket in the desired position. A plurality of holes 26 are provided in vertical leg 14 and are adapted to receive the break pin 25, the pin being inserted in the hole adjacent the upper edges of beam members 18.

The break pin 25 should be of sufficient strength to withstand the strain of normal operating conditions, which is occasioned in drawing tooth 5 through the soil, but which will shear when the tooth engages an unyielding object. This affords protection against breakage to spring tooth 5 and its associated parts. I find that an ordinary small cotter pin serves effectively for the break pin 25, and such is shown in the drawing.

The spring tooth 5 is usually spaced laterally from drag bar 12 and is mounted on horizontal leg 15 adjacent the end thereof. Due to the pressure of the soil on tooth 5 a considerable strain is directed to leg 15, which may at times become so excessive as to bend the leg causing tooth 5 to assume a tilted position. In order to strengthen bracket 11 so as to maintain tooth 5 in a proper position, an angle brace 28 is provided between drag bar 12 and tooth 5. The angle brace 28 comprises a horizontal leg 29 and a vertical leg 30. The horizontal leg 29 is secured to the top of clamping plate 16 by bolts 17 and vertical leg 30 is held in contact with the outer face of the adjacent beam 18 of drag bar 12 by attaching bolt 21. By reason of brace 28 being spaced appreciably from bracket 11, the two together form somewhat of a bridge-like construction which is effective to resist distortion in all directions.

What I claim is:

1. In a cultivator, a drag bar comprising a pair of spaced beams, an L-shaped bracket having a vertical leg and a horizontal leg, the vertical leg being clamped between said beams and said horizontal leg extending laterally to one side of said drag bar, an L-shaped brace having a vertical leg fixed to the outer face of one of said beams and a horizontal leg extending laterally in parallel spaced relation to the horizontal leg of said bracket, a spring tooth having its upper end disposed between the outer ends of said horizontal legs, and means for rigidly clamping said spring tooth and said horizontal legs together, said means comprising a clamping plate disposed between one of said horizontal legs and said spring tooth and having a lug on each side engaging the sides of said spring tooth, and a pair of bolts disposed on opposite sides of said spring tooth and extending through aligned perforations in said horizontal legs and said clamping plate, said spaced horizontal legs forming a bridge-like construction for resisting distortion of the bracket.

2. In a cultivator, a drag bar comprising a beam, an L-shaped bracket having a vertical leg and a horizontal leg, the vertical leg being clamped to one side of said beam and said horizontal leg extending laterally to one side of said beam, an L-shaped brace having a vertical leg fixed to the opposite side of said beam and a horizontal leg extending laterally in parallel spaced relation to the horizontal leg of said bracket, a cultivating tool having its upper end disposed between the outer ends of said horizontal legs, and means for rigidly clamping said tool and said horizontal legs together including a clamping plate having lugs engaging the sides of said tool, said spaced horizontal legs with said clamping means forming a bridge-like construction for resisting distortion of the bracket.

3. In a cultivator, a drag bar comprising a beam, an L-shaped bracket having a vertical leg and a horizontal leg, the vertical leg being clamped to one side of said beam and said horizontal leg extending laterally to one side of said beam, an L-shaped brace having a vertical leg fixed to the other side of said beam and having a horizontal leg extending laterally in parallel spaced relation to the horizontal leg of said bracket, a cultivating tool having its upper end disposed between the outer ends of said horizontal legs, and means for rigidly clamping said tool and said horizontal legs together, said spaced horizontal legs with said clamping means forming a bridge-like construction for resisting distortion of the bracket.

4. In a cultivator, a drag bar comprising a beam, a ground engaging tool, a supporting bracket for said tool, a bolt extending through aligned holes in said beam and said bracket by which said bracket is pivotally connected to said beam, a second bolt extending through a hole in said beam and a slot in said bracket arcuate about said first bolt as a center, and a break pin disposed in a hole in said bracket and engaging said beam and cooperating with said bolts to prevent rotation of said bracket about said first bolt, but permitting such rotation when an obstruction is encountered by said tool.

THEODORE J. ERDMAN.